(12) United States Patent
Fukuda

(10) Patent No.: US 9,272,790 B2
(45) Date of Patent: Mar. 1, 2016

(54) NITROGEN ENRICHED AIR SUPPLY SYSTEM AND AIRCRAFT

(71) Applicant: MITSUBISHI AIRCRAFT CORPORATION, Aichi (JP)

(72) Inventor: Koki Fukuda, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 86 days.

(21) Appl. No.: 14/070,663

(22) Filed: Nov. 4, 2013

(65) Prior Publication Data

US 2016/0009407 A1    Jan. 14, 2016

(30) Foreign Application Priority Data

Nov. 9, 2012   (JP) .................................. 2012-247270

(51) Int. Cl.
*B01D 53/02*        (2006.01)
*B64D 37/32*        (2006.01)

(52) U.S. Cl.
CPC ............... *B64D 37/32* (2013.01); *Y10S 261/02* (2013.01)

(58) Field of Classification Search
CPC ............................... B64D 37/32; Y10S 261/02
See application file for complete search history.

(56) References Cited

U.S. PATENT DOCUMENTS

| | | | |
|---|---|---|---|
| 4,556,180 A * | 12/1985 | Manatt ..................... | 244/135 R |
| 6,547,188 B2 | 4/2003 | Schmutz et al. | |
| 7,971,828 B2 | 7/2011 | Massey et al. | |
| 2004/0000353 A1* | 1/2004 | Jones .............................. | 141/64 |
| 2004/0065383 A1* | 4/2004 | Jones et al. ..................... | 141/66 |
| 2004/0065778 A1* | 4/2004 | Jones ....................... | 244/135 R |
| 2004/0226438 A1* | 11/2004 | Jones ................................ | 95/45 |
| 2005/0115404 A1* | 6/2005 | Leigh et al. ...................... | 95/11 |
| 2005/0247197 A1* | 11/2005 | Snow, Jr. ......................... | 95/138 |
| 2007/0023577 A1* | 2/2007 | Jones ....................... | 244/135 R |
| 2010/0310392 A1* | 12/2010 | Lippold et al. ................ | 417/405 |

\* cited by examiner

*Primary Examiner* — Christopher P Jones
(74) *Attorney, Agent, or Firm* — Pearne & Gordon LLP

(57) ABSTRACT

The present invention intends to extend the operating life of an air separation module (ASM) in a nitrogen enriched air (NEA) supply system by controlling the temperature of bleed air as a supply source of the NEA. The NEA supply system produces NEA that is enriched with nitrogen upon supply of source gas during a flight through an ascent phase, a cruising phase, and a descent phase, and supplies the NEA to a fuel tank, the system including: an air separation module that separates oxygen and nitrogen in the source gas; and a temperature regulation mechanism that regulates a temperature of the source gas supplied to the air separation module. In at least a part of a flight period through the ascent phase and the cruising phase, the temperature regulation mechanism regulates the temperature of the source gas to below a temperature of the source gas in the descent phase.

13 Claims, 2 Drawing Sheets

NITROGEN ENRICHED AIR SUPPLY SYSTEM AND AIRCRAFT

BACKGROUND OF THE INVENTION

1. Field of the Invention

The present invention relates to a system which supplies gas enriched with nitrogen more than air to an aircraft fuel tank.

2. Description of the Related Art

Since an aircraft fuel tank is filled with vaporized fuel during a flight, it is necessary to prevent explosion of the fuel tank when, for example, the fuel tank is struck by lightning or a short occurs in the wiring. Thus, there has been proposed an explosion-proof system which supplies nitrogen enriched air (referred to as NEA below) having a higher nitrogen concentration and a lower oxygen concentration than air to the fuel tank.

While the air has an oxygen concentration of about 21%, the oxygen concentration of the NEA is set to, for example, 12% or less. To produce the NEA, an air separation module (ASM) that uses a permselective membrane composed of high molecules having different permeability coefficients for oxygen molecules and nitrogen molecules is employed. Bleed air from a flight engine is used as a supply source of air to be supplied to the ASM.

U.S. Pat. No. 6,547,188 proposes a process for supplying NEA to an aircraft fuel tank.

U.S. Pat. No. 6,547,188 employs the concentration of inert gas in the NEA, and the supply of the NEA to the fuel tank as a target of control. In U.S. Pat. No. 6,547,188, the two control targets are adjusted according to a flight phase from takeoff to landing of the aircraft. In U.S. Pat. No. 6,547,188, the flight phase is divided into a phase from takeoff until entering a descent phase for landing through an ascent phase and a cruising phase (referred to as first phase below), and the descent phase (referred to as second phase below).

In U.S. Pat. No. 6,547,188, a relatively small amount of NEA is supplied in the first phase, and a relatively large amount of NEA is supplied in the second phase. It is described in U.S. Pat. No. 6,547,188 that the supply of the NEA to the fuel tank is increased in the second phase so as to compensate for an increase in the atmospheric pressure since the altitude is lowered in the second phase.

The oxygen separation performance of the ASM used in the process for supplying the NEA to the aircraft fuel tank depends on the temperature and the pressure of the bleed air supplied to the ASM. For example, when the bleed air supplied to the ASM has a high temperature (about 180° F.), high oxygen separation performance is obtained. Thus, desired NEA with a high concentration can be produced even when more bleed air is supplied. Meanwhile, when the temperature of the supplied bleed air is lower, the oxygen separation performance is deteriorated. Thus, when the NEA with the same nitrogen concentration is to be obtained, the amount of production of the NEA is decreased. Therefore, the bleed air is normally supplied to the ASM with the temperature regulated so as to produce more NEA.

When the ASM is continuously used, the oxygen separation performance is deteriorated. It is thus necessary to replace the ASM at regular intervals. However, a permselective membrane constituting the ASM is expensive, and a replacement operation thereof is complicated.

The present invention has been made in view of such problems, and an object thereof is to provide an NEA supply system which can decrease the replacement frequency of an ASM.

SUMMARY OF THE INVENTION

To achieve the above object, a nitrogen enriched air (NEA) supply system according to the present invention is an NEA supply system which produces NEA that is enriched with nitrogen upon supply of source gas during a flight of an aircraft through an ascent phase, a cruising phase, and a descent phase, and supplies the NEA to a fuel tank of the aircraft, the system including: an air separation module that separates oxygen and nitrogen in the source gas; and a temperature regulation mechanism that regulates a temperature of the source gas supplied to the air separation module. In at least a part of a flight period through the ascent phase and the cruising phase, the temperature regulation mechanism regulates the temperature of the source gas to below a temperature of the source gas in the descent phase.

As described above, the oxygen separation performance of the ASM is changed by the temperature of the source gas (bleed air). It is necessary to supply bleed air having a relatively high temperature to the ASM so as to obtain high separation performance. While the supply of the NEA to the fuel tank needs to be increased in a second phase (the descent phase), the NEA may be supplied in a small amount in a first phase (the ascent phase and the cruising phase) before the second phase. Accordingly, the present inventors have achieved the present invention based on an idea that the ASM is not required to have high oxygen separation performance in the first phase, that is, the temperature of the bleed air supplied to the ASM may be decreased.

In the present invention, in at least a part of the flight period through the ascent phase and the cruising phase, the source gas supplied to the air separation module may be set to a flow rate smaller than that in the descent phase. Accordingly, the amount of the source gas passing through the ASM is decreased, so that the operating life of a permselective membrane constituting the air separation module can be effectively extended.

In the present invention, the air separation module may preferably include a hollow fiber polymer membrane.

Accordingly, the oxygen separation performance of the air separation module in the entire flight period or a part of the flight period through the ascent phase and the cruising phase can be reduced to below the oxygen separation performance of the air separation module in the descent phase.

In the present invention, when the NEA supply system includes a main pipe through which the source gas flows, the temperature regulation mechanism may include a bypass pipe for the main pipe, and regulate the temperature of the source gas in the bypass pipe. In this case, the temperature regulation mechanism may preferably regulate an amount of the source gas distributed to the main pipe and the bypass pipe according to the temperature of the source gas supplied to the air separation module.

In the present invention, the temperature regulation mechanism may also regulate the temperature of the source gas according to an altitude of the aircraft.

The present invention also provides an aircraft including an NEA supply system having the above function.

In accordance with the present invention, the deterioration of the permselective membrane constituting the ASM (air separation module) can be suppressed by decreasing the temperature of the bleed air supplied to the ASM in the ascent phase and the cruising phase to below that in the descent phase. The replacement frequency of the ASM can be thereby reduced.

DETAILED DESCRIPTION OF THE PREFERRED EMBODIMENT

Figure 1:
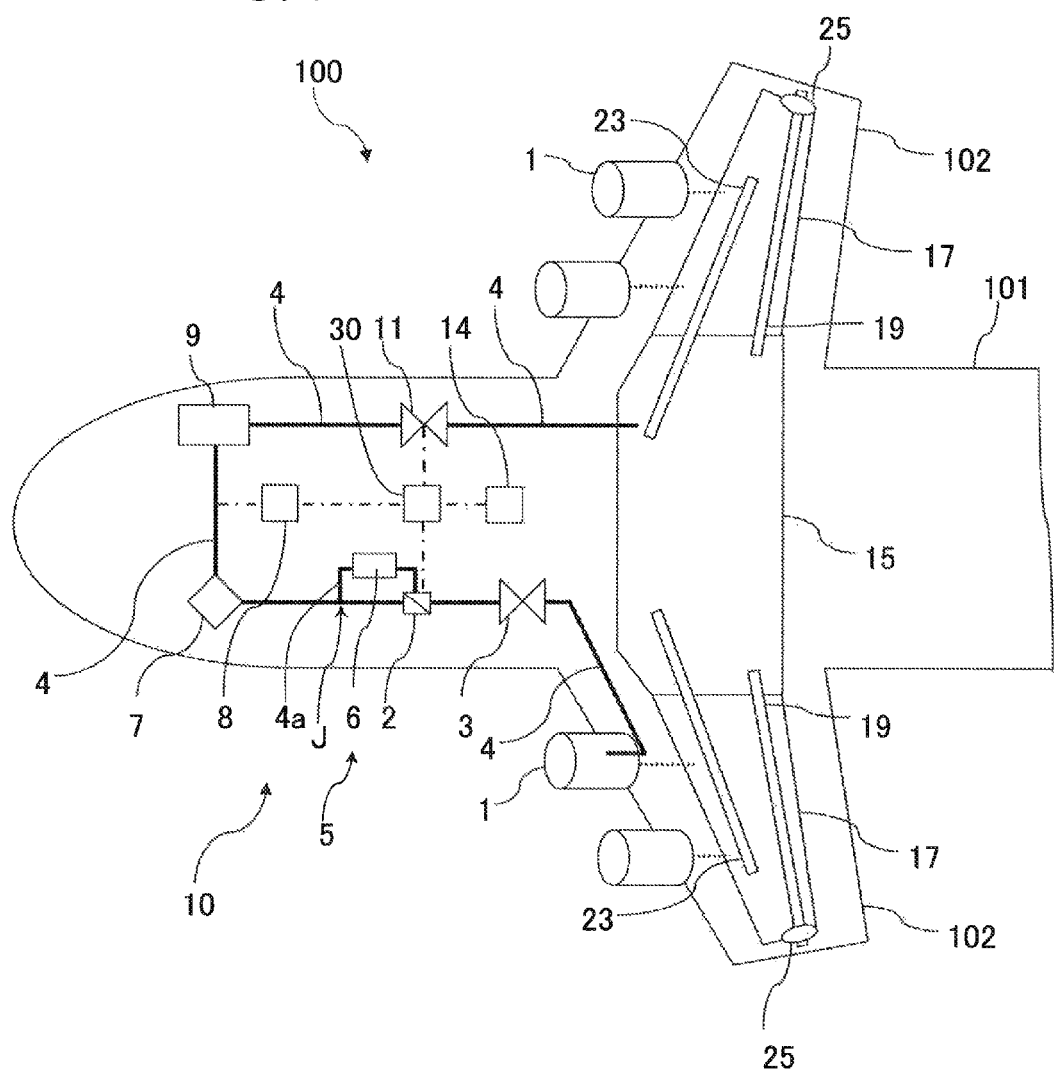
FIG. 1 is a view illustrating a schematic configuration of an aircraft according to a present embodiment.

In the following, an example in which a nitrogen enriched air (referred to as NEA below) supply system using an air separation module with extended operating life according to the present invention is applied to an aircraft 100 is described in detail based on an embodiment shown in FIGS. 1 and 2.

The aircraft 100 includes a pair of right and left main wings 102, an aircraft fuselage 101 to which the main wings 102 are mounted, a first fuel tank 15 provided in the aircraft fuselage 101, and second fuel tanks 17 provided in each of the main wings 102. A vent pipe 19 and a spill-back pipe 23 are provided between the first fuel tank 15 and one of the second fuel tanks 17, and another vent pipe 19 and another spill-back pipe 23 are provided between the first fuel tank 15 and the other second fuel tanks 17, so as to penetrate the boundary between them.

The vent pipes 19 are provided so as to adjust the internal pressure of the first fuel tank 15. Air is guided into and out of the aircraft through the vent pipe 19. For example, when the external atmospheric pressure is lowered along with an increase in the altitude of the aircraft 100, air in an internal space of the first fuel tank 15 is correspondingly discharged outside the aircraft through the vent pipe 19, thereby lowering the internal pressure of the first fuel tank 15. When the aircraft 100 descends, the opposite operation is performed.

The spill-back pipes 23 are provided so as to adjust the amount of fuel in the first fuel tank 15 and the second fuel tanks 17.

The NEA supply system 10 according to the present embodiment supplies NEA into the first fuel tank 15 provided in the aircraft 100 to thereby prevent explosion of fuel as shown in FIG. 1.

The NEA supply system 10 includes a gas pipe (main pipe) 4 that guides bleed air (source gas) from an engine 1 into the first fuel tank 15. An on-off valve 3, a temperature regulation mechanism 5, a filter 7, an air separation module (referred to as ASM below) 9, and a flow control valve (FCV) 11 are sequentially disposed on the gas pipe 4. The bleed air from the engine 1 passes through the respective devices in the above order from the on-off valve 3 via the gas pipe 4, and is thereafter supplied to the first fuel tank 15 as the NEA.

The first fuel tank 15 is merely an example of a target to which the NEA is supplied, and the second fuel tanks 17 may be also the target to which the NEA is supplied.

Air compressed within the engine 1 that generates a thrust for the aircraft 100 is partially removed as the bleed air, and guided to the on-off valve 3 through the gas pipe 4.

Subsequently, the bleed air is guided through the gas pipe 4 to the temperature regulation mechanism 5, where the temperature of the bleed air is regulated. The temperature regulation mechanism 5 controls the temperature of the bleed air guided to the ASM 9 since the oxygen separation performance of the ASM 9 is related to the temperature of the supplied bleed air. As an example, while the ASM 9 has high separation performance at a temperature (referred to as optimum temperature below) ranging from 180° F. to 200° F. (about 82° C. to about 93° C.), the temperature of the bleed air from the engine 1 is 300° F. to 500° F. (about 149° C. to about 260° C.). Therefore, the bleed air from the engine 1 is cooled to the optimum temperature in the temperature regulation mechanism 5. The temperature regulation mechanism 5 can also cool the bleed air to a suppression temperature lower than the optimum temperature. In the present embodiment, the bleed air can be selectively cooled to the optimum temperature or the suppression temperature according to a flight phase of the aircraft 100 as described later.

The temperature regulation mechanism 5 includes a temperature sensor 8, a bypass pipe 4a that branches from the gas pipe 4 and joins the gas pipe 4 again, a radiator 6 that is placed around the bypass pipe 4a, and a flow regulation valve 2 that is placed at a branch point between the gas pipe 4 and the bypass pipe 4a. A control unit 30 described later controls the operation of the temperature regulation mechanism 5.

The temperature regulation mechanism 5 is operated according to the altitude of the aircraft 100. The temperature regulation mechanism 5 cools and regulates the bleed air to the suppression temperature in an ascent phase and a cruising phase, and cools and regulates the bleed air to the optimum temperature in a descent phase.

The temperature sensor 8 detects the temperature of the bleed air passing through the inside of the gas pipe 4 to be supplied to the ASM 9, downstream of the filter 7. The detected temperature information is transmitted to the control unit 30. The control unit 30 is described later.

The bleed air flowing through the gas pipe 4 flows into the bypass pipe 4a from the branch point, passes through the radiator 6, and joins the gas pipe 4. The position of joining is referred to as a junction J below.

The radiator 6 is a heat exchanger that radiates heat from the high-temperature bleed air passing through the bypass pipe 4a and thereby cools the bleed air. Thus, the temperature of the bleed air passing through the bypass pipe 4a is decreased to below the temperature of the bleed air directly flowing through the gas pipe 4 without flowing into the bypass pipe 4a. The atmosphere introduced from around the aircraft 100, or cold air produced by an air conditioner provided in the aircraft 100 may be used as a cooling medium of the radiator 6.

Although the example in which the radiator 6 is placed around the bypass pipe 4a so as to cool the bleed air is described in the present embodiment, the radiator is merely an example, and cooling means other than the radiator may be also provided in the gas pipe 4.

The flow regulation valve 2 regulates the amount of the bleed air flowing into each of the gas pipe 4 and the bypass pipe 4a at the branch point. For example, when the amount of the bleed air flowing through the gas pipe 4 before the branch point is "10", the amounts of the bleed air flowing into the respective pipes are regulated and distributed by the flow regulation valve 2 by setting, for example, the amount of the bleed air directly flowing into the gas pipe 4 to "3", and the amount of the bleed air flowing into the bypass pipe 4a to "7". The amount of distribution is regulated based on an instruction from the control unit 30. This point is described later.

The distribution ratio of the amount of the bleed air directly flowing into the gas pipe 4 and the amount of the bleed air flowing into the bypass pipe 4a is changed as described above, and the bleed air cooled in the bypass pipe 4a is mixed into the bleed air having a high temperature from the engine 1 after the junction J. The temperature of the bleed air supplied to the ASM 9 is thereby regulated.

Subsequently, the temperature-regulated bleed air passes through the filter 7, and is guided to the ASM 9.

The filter 7 removes a substance that contaminates the ASM 9. If the contaminant is not removed by the filter 7, a permselective membrane constituting the ASM 9 is clogged, and resultantly cannot permeably separate oxygen in a proper way. Thus, desired NEA cannot be obtained.

The ASM 9 includes a hollow fiber polymer membrane (permselective) as a main constituent element. The NEA is obtained by using a property that oxygen gas permeates through the hollow fiber wall several times more easily than nitrogen gas. That is, when the bleed air passes through the ASM 9, the bleed air is separated into two types of gasses, one of which is oxygen enriched air with a high oxygen concentration produced by permeation through the hollow fiber wall, and the other of which is the NEA produced by passing through the hollow fiber. The ASM 9 including the hollow fiber polymer membrane as the main constituent element is merely an example, and a wide variety of modules that exert the above function, such as an ASM using an oxygen-absorbing polymer membrane, may be applied in the present invention.

The obtained NEA is supplied to the first fuel tank 15 through the gas pipe 4 by the opening/closing operation of the FCV 11. The opening/closing operation of the FCV 11 is controlled by a control unit 30. The opening/closing operation includes regulation of an opening degree. When the opening degree is increased, more bleed air is supplied to the ASM 9, so that more NEA can be supplied to the first fuel tank 15.

The NEA supply system 10 includes an altimeter 14 so as to allow the control unit 30 to control the opening/closing operation of the FCV 11.

The altimeter 14 detects the altitude of the aircraft 100 during a flight.

The control unit 30 controls the opening/closing operation of the FCV 11 based on the information regarding the aircraft 100 described above.

A residual fuel detector that can detect the amount of fuel remaining in the first fuel tank 15 during a flight is provided in the first fuel tank 15.

The control unit 30 also controls the amount of distribution of the bleed air in the flow regulation valve 2. The control unit 30 acquires information regarding the temperature from the temperature sensor 8, and information regarding the altitude from the altimeter 14 so as to control the amount of distribution.

The control unit 30 determines the flight phase to be the ascent phase, the cruising phase, or the descent phase based on the altitude information obtained from the altimeter 14, and sets the temperature of the bleed air supplied to the ASM 9 according to the respective phases. For example, the temperature in the ascent phase and the cruising phase is set to 160° F. (the suppression temperature), and the temperature in the descent phase is set to 185° F. (the optimum temperature). The ascent phase, the cruising phase, and the descent phase can be set apart from each other by differentiating the continuously-acquired altitude information with respect to time.

The control unit 30 controls the flow regulation valve 2 so as to obtain the amount of distribution corresponding to the set temperature. For example, to regulate the temperature of the bleed air to 160° F., the bleed air is distributed by setting the amount of the bleed air directly flowing into the gas pipe 4 to "3", and the amount of the bleed air flowing into the bypass pipe 4a to "7". To regulate the temperature of the bleed air to 185° F., the bleed air is distributed by setting the amount of the bleed air directly flowing into the gas pipe 4 to "4", and the amount of the bleed air flowing into the bypass pipe 4a to "6".

The control unit 30 performs a following process so as to achieve the set temperature control as described above.

The control unit 30 acquires the temperature of the bleed air detected by the temperature sensor 8 immediately before the bleed air is supplied to the ASM 9. The control unit 30 adjusts the amount of distribution in the flow regulation valve 2 based on the acquired temperature information. For example, when the temperature detected by the temperature sensor 8 is higher than the set temperature (the suppression temperature or the optimum temperature), the amount of the bleed air flowing into the bypass pipe 4a is controlled to be increased.

Next, a method for controlling the temperature of the bleed air supplied to the ASM 9 in the respective flight phases is described by reference to FIG. 2. In FIG. 2, a solid line α indicates the temperature of the bleed air supplied to the ASM 9 in the present embodiment, and a broken line β indicates the temperature of the bleed air in a comparative example.

Figure 2:
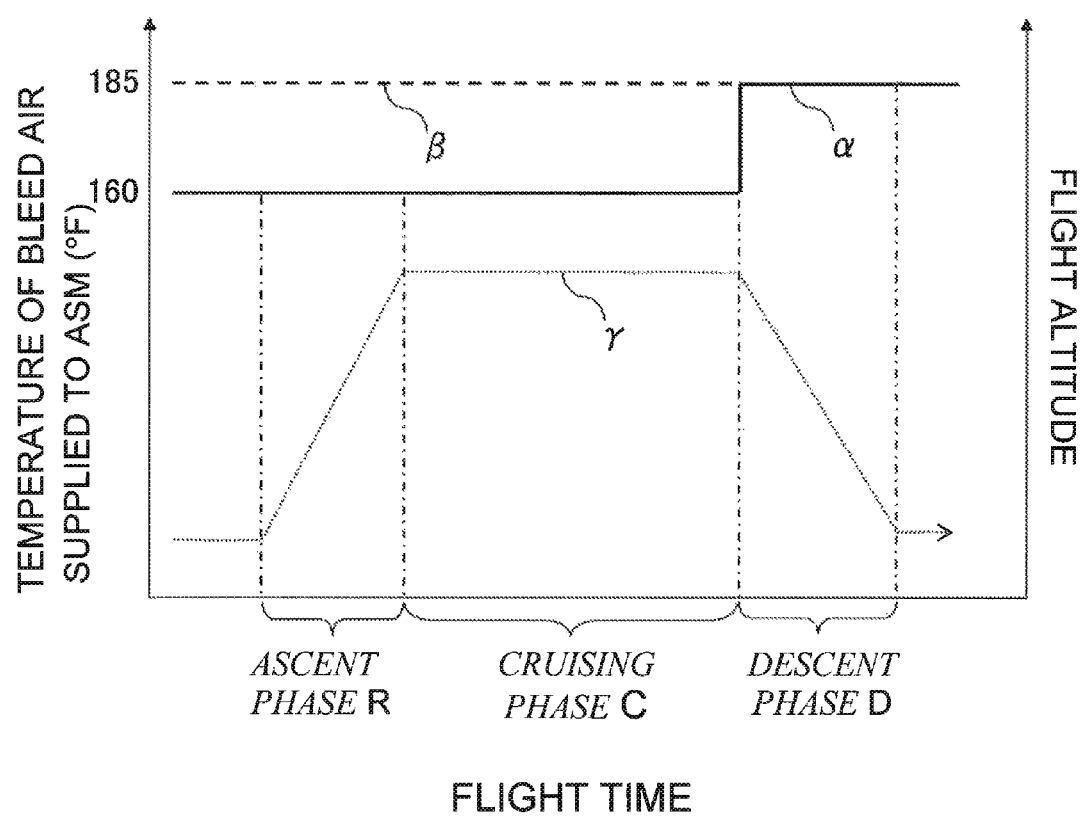
FIG. 2 is a graph collectively illustrating a relationship between a flight time and the temperature of bleed air supplied to an ASM, and a relationship between the flight time and a flight altitude according to the present embodiment, with the horizontal axis representing the flight elapsed time, the vertical axis on the left side representing the temperature of bleed air supplied to the ASM, and the vertical axis on the right side representing the flight altitude.

In FIG. 2, a dotted line γ indicates the flight altitude in the respective phases of the aircraft. An ascent phase R indicates a flight phase from takeoff to a cruising phase C of the aircraft, the cruising phase C a phase in which the aircraft continues to fly in a steady flight state, and a descent phase D a flight phase from the cruising phase C to landing of the aircraft.

The present embodiment is featured in controlling the temperature of the bleed air supplied to the ASM 9 in the ascent phase R and the cruising phase C (160° F.) to be lower than that in the descent phase D (185° F.) as indicated by the solid line α.

In the ascent phase R from the takeoff of the aircraft 100, the air occupying the internal space of the first fuel tank 15 is released outside the aircraft through the vent pipe 19 in response to a decrease in the atmospheric pressure along with an increase in the flight altitude. Thus, in the ascent phase R, it is only necessary to supply the NEA in an amount corresponding to the consumption of fuel in the flight. The fuel is gradually decreased during the flight, and the NEA gas is supplied throughout the period. That is, the inside of the first fuel tank 15 is maintained at an oxygen concentration at which the fuel explosion can be prevented. Therefore, even when the supply of the NEA is decreased, the fuel explosion in the first fuel tank 15 can be prevented. The supply of the NEA can be determined by the opening degree of the FCV 11.

When the NEA is produced from the bleed air having the suppression temperature lower than the optimum temperature, e.g., 160 to 170° F., the oxygen separation performance is deteriorated. It is thus necessary to decrease the amount of the bleed air supplied to the ASM 9. Even when the NEA is supplied into the first fuel tank 15 in the smaller amount as described above, the oxygen concentration within the internal space of the first fuel tank 15 can be maintained low.

When the bleed air having the suppression temperature lower than the optimum temperature is supplied to the ASM 9 as described above, the progress of deterioration of the permselective membrane constituting the ASM 9 due to heat can be suppressed. The progress of deterioration of the permselective membrane due to heat can be also suppressed by decreasing the amount of the bleed air passing through the ASM 9.

The temperature of the bleed air is regulated to the suppression temperature (160 to 170° F.) by using the aforementioned temperature regulation mechanism 5.

Subsequently, in the cruising phase C, it is enough to supply the NEA in the amount mostly corresponding to the consumption of fuel in the flight similarly to the ascent phase R since the aircraft 100 does not experience any rapid change in the altitude. That is, even when the supply of the NEA is decreased similarly to the ascent phase R, the fuel explosion in the first fuel tank 15 can be prevented. Accordingly, in the cruising phase C, the oxygen concentration within the internal space of the first fuel tank 15 can be maintained low, and the heat deterioration of the permselective membrane constituting the ASM 9 can be also suppressed by supplying the NEA obtained from the bleed air having the suppression temperature lower than the optimum temperature into the first fuel tank 15.

Meanwhile, in the descent phase D, when the flight altitude is lowered along with descending of the aircraft 100, outside air flows into the first fuel tank 15 from a vent port 25 in response to an increase in the atmospheric pressure. As a result, the NEA and the outside air are mixed in the first fuel tank 15, and the oxygen concentration within the internal space of the first fuel tank 15 is increased. The risk of fuel explosion is thereby increased. Thus, it is necessary to decrease the oxygen concentration by producing more NEA at the optimum temperature and supplying the NEA into the first fuel tank 15.

The NEA with a high nitrogen concentration can be obtained by regulating the temperature of the bleed air supplied to the ASM 9 to the optimum temperature. Accordingly, in the descent phase D, the NEA having the optimum temperature higher than the suppression temperature in the ascent phase R and the cruising phase C is supplied. The temperature of the bleed air is regulated to the optimum temperature (185° F.) by using the aforementioned temperature regulation mechanism 5.

As described above, in the present embodiment, the bleed air is supplied at the suppression temperature in the ascent phase R and the cruising phase C. Thus, as compared to the case in which the bleed air is supplied at the optimum temperature to the ASM 9 throughout the entire flight phase as indicated by the broken line β, the operating life of the permselective membrane constituting the ASM 9 is extended. Accordingly, the replacement frequency of the ASM 9 can be reduced.

Although the preferable embodiment of the present invention has been described above, constitutions described in the embodiment described above may be also freely selected or changed into other constitutions as described below without departing from the gist of the present invention.

Although the suppression temperature and the optimum temperature are both set to fixed values in the present embodiment (the solid line α in FIG. 2), this is not necessarily required. For example, the suppression temperature and the optimum temperature may be gradually or continuously increased or decreased, or locally increased or decreased in the present invention. In this case, for example, when the temperature is locally increased from the suppression temperature, the temperature may exceed the optimum temperature. However, the temperature may exceed the optimum temperature only locally, that is, only in a limited period of time. In consideration of such a case, the temperature level of the bleed air in the present invention should be determined based on an average value. The average value is a value obtained by dividing the sum of T1 to Tn by n when a temperature actually measured at a predetermined time interval t is T1, T2, T3, . . . and Tn.

Although the suppression temperature is employed in both of the ascent phase R and the cruising phase C in the present embodiment, this is not necessarily required. For example, the suppression temperature may be employed only in one of the phases.

The source gas used for producing the NEA is not limited to the bleed air from the engine, and may be also obtained from another device that discharges gas, such as an auxiliary power unit and a compressor.

What is claimed is:

1. A nitrogen enriched air supply system which produces nitrogen enriched air that is enriched with nitrogen upon supply of source gas during a flight of an aircraft through an ascent phase, a cruising phase, and a descent phase, and supplies the nitrogen enriched air to a fuel tank of the aircraft, the system comprising:
    an altimeter that detects an altitude of the aircraft during the flight;
    an air separation module that separates oxygen and nitrogen in the source gas; and
    a temperature regulation mechanism that regulates a temperature of the source gas supplied to the air separation module according to the ascent phase, the cruising phase, and the descent phase determined based on altitude information from the altimeter,
    wherein, in at least a part of a flight period through the ascent phase and the cruising phase, the temperature regulation mechanism sets the temperature of the source gas to below a temperature of the source gas in the descent phase.

2. The nitrogen enriched air supply system according to claim 1, wherein
    in at least a part of the flight period through the ascent phase and the cruising phase,
    the source gas supplied to the air separation module is set to a flow rate smaller than that in the descent phase.

3. The nitrogen enriched air supply system according to claim 1, wherein
    the air separation module includes a hollow fiber polymer membrane.

4. The nitrogen enriched air supply system according to of claim 1, wherein
    the system includes a main pipe through which the source gas flows,
    the temperature regulation mechanism includes a bypass pipe for the main pipe, and regulates a temperature of the source gas in the bypass pipe.

5. The nitrogen enriched air supply system according to claim 4, wherein
    the temperature regulation mechanism regulates an amount of the source gas distributed to the main pipe and the bypass pipe
    according to the temperature of the source gas supplied to the air separation module.

6. The nitrogen enriched air supply system according to claim 4, wherein
    the air separation module is disposed on the main pipe.

7. The nitrogen enriched air supply system according to claim 6, wherein
    the system further includes a flow control valve on the main pipe,
    the produced nitrogen enriched air is supplied to the fuel tank through the main pipe by an opening/closing operation of the flow control valve.

8. The nitrogen enriched air supply system according to claim 4, wherein
    the temperature regulation mechanism further includes
    a temperature sensor,
    cooling means that cools the source gas passing through the bypass pipe or the main pipe, and
    a flow regulation valve that is placed at a branch point between the gas pipe and the bypass pipe.

9. The nitrogen enriched air supply system according to claim 8, wherein
the cooling means is a heat exchanger that is placed around the bypass pipe.

10. The nitrogen enriched air supply system according to claim 1, wherein
the system further includes a filter for removing a substance that contaminates the air separation module, and
the source gas which has been temperature-regulated by the temperature regulation mechanism passes through the filter and is supplied to the air separation module.

11. The nitrogen enriched air supply system according to claim 1, wherein
the source gas is a bleed air from an engine that generates a thrust for the aircraft.

12. An aircraft comprising the nitrogen enriched air supply system according to claim 1.

13. A nitrogen enriched air supply system which produces nitrogen enriched air that is enriched with nitrogen upon supply of source gas during a flight of an aircraft through an ascent phase, a cruising phase, and a descent phase, and supplies the nitrogen enriched air to a fuel tank of the aircraft, the system comprising:

a main pipe through which the source gas flows;
an air separation module that separates oxygen and nitrogen in the source gas;
a temperature regulation mechanism comprising a bypass pipe for the main pipe, a temperature sensor, and cooling means that cools the source gas passing through the bypass pipe or the main pipe, the temperature regulation mechanism regulating a temperature of the source gas supplied to the air separation module, a temperature of the source gas in the bypass pipe, and an amount of the source gas flowing into the bypass pipe; and
a flow regulation valve that regulates the amount of the source gas flowing through the bypass pipe and the main pipe according to instructions from the temperature regulation mechanism,
wherein, in at least a part of a flight period through the ascent phase and the cruising phase, the temperature regulation mechanism sets the temperature of the source gas to below a temperature of the source gas in the descent phase, and
wherein the flow regulation valve is placed upstream at a branch point of the bypass pipe and the main pipe.

* * * * *